US007813547B1

(12) United States Patent
Spangler

(10) Patent No.: US 7,813,547 B1
(45) Date of Patent: Oct. 12, 2010

(54) APPARATUS AND METHOD FOR DETECTION AND ANALYSIS OF IMAGERY

(75) Inventor: Brian Spangler, Ashburn, VA (US)

(73) Assignee: Unisys Corporation, BlueBell, PA (US)

( * ) Notice: Subject to any disclaimer, the term of this patent is extended or adjusted under 35 U.S.C. 154(b) by 1134 days.

(21) Appl. No.: 11/398,304

(22) Filed: Apr. 5, 2006

(51) Int. Cl.
*G06K 9/00* (2006.01)

(52) U.S. Cl. ..................... 382/169

(58) Field of Classification Search ......... 382/168–172, 382/176, 205, 270, 275, 306, 312; 358/1.1, 358/1.9, 466; 348/701
See application file for complete search history.

(56) References Cited

U.S. PATENT DOCUMENTS

| | | | |
|---|---|---|---|
| 5,185,852 A * | 2/1993 | Mayer | 358/1.9 |
| 5,889,885 A | 3/1999 | Moed et al. | |
| 6,728,391 B1 | 4/2004 | Wu et al. | |
| 7,003,166 B2 * | 2/2006 | Abhyankar et al. | 382/237 |
| 7,177,476 B2 * | 2/2007 | Abhyankar et al. | 382/237 |

OTHER PUBLICATIONS

S. Mori et al, "Optical character recognition", 1999, John Wiley & Sons, Inc., XP002454531, Section 4.3. "Adaptive thresholding based on topographical image analysis".
D4: U.U. Sheikh—"Real-time barcode reader using active vision", Master's thesis, Faculty of Electrical Engineering, Tech. Univ. Malaysia, Oct. 2004.
D5: Li et al.—"A window-based bar code acquisition system", SPIE vol. 2181 Document recognition, pp. 125-132, Feb. 9, 1994, XP000642511.

* cited by examiner

*Primary Examiner*—Jose L Couso
(74) *Attorney, Agent, or Firm*—James E. Goepel

(57) ABSTRACT

An apparatus and method for detecting and analyzing imagery, wherein the apparatus includes an image data acquisition means, an image data conversion means, and an adaptive thresholding means. The image data acquisition means acquires image data from a document. The acquired image data is converted into a grayscale image frame by the image data conversion means. In addition, the adaptive thresholding means converts the grayscale image frame into a bi-tonal frame.

21 Claims, 13 Drawing Sheets

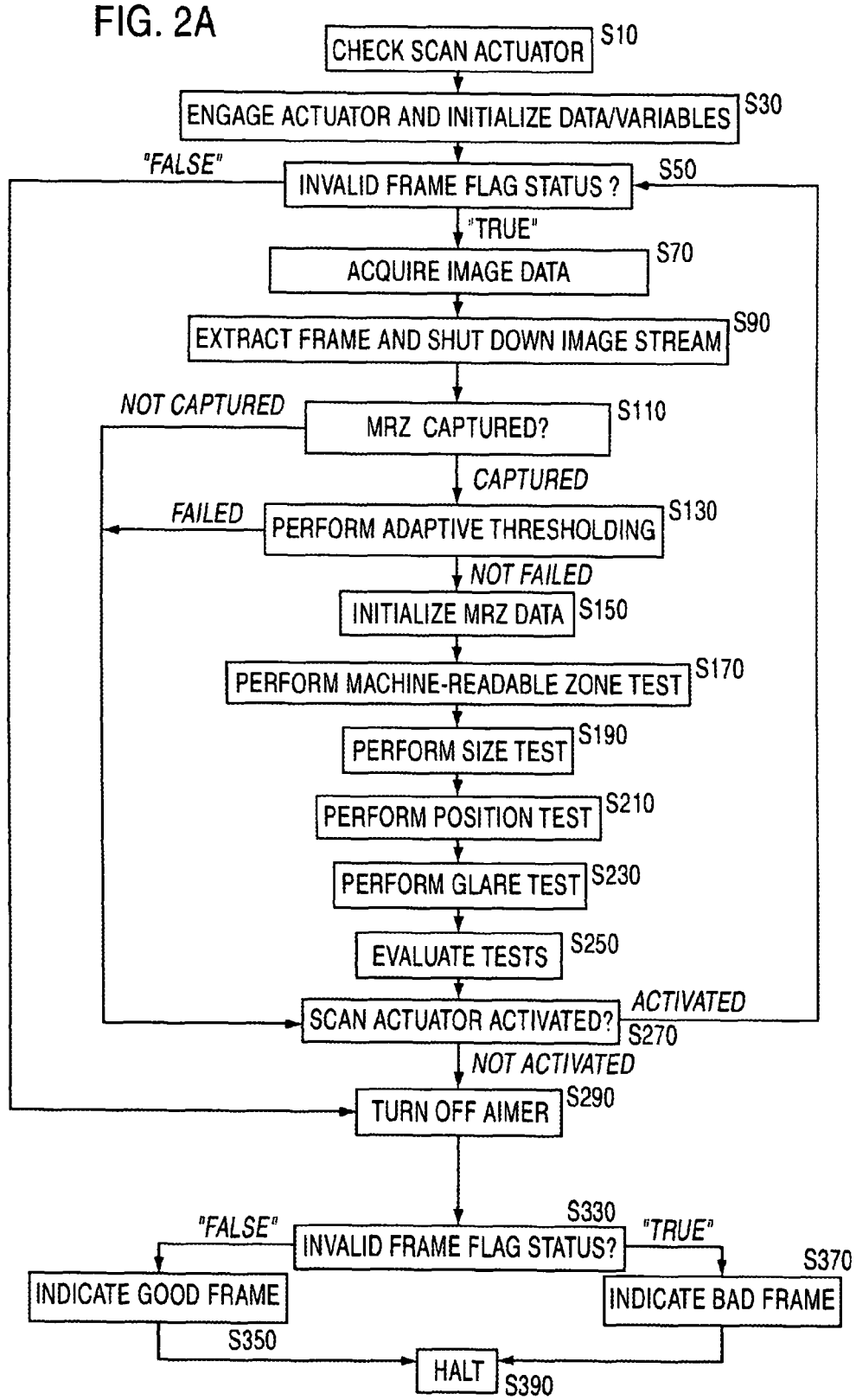

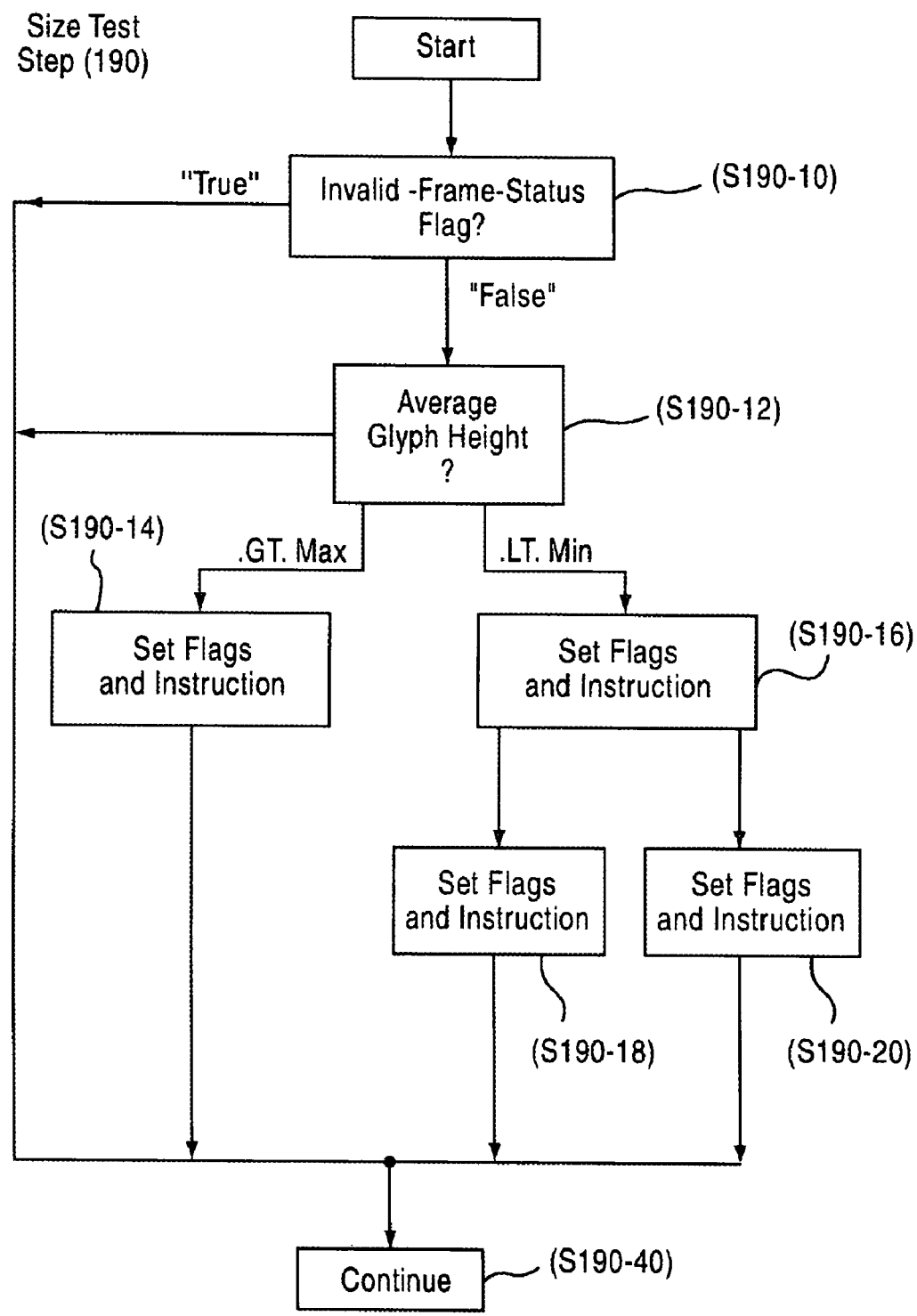

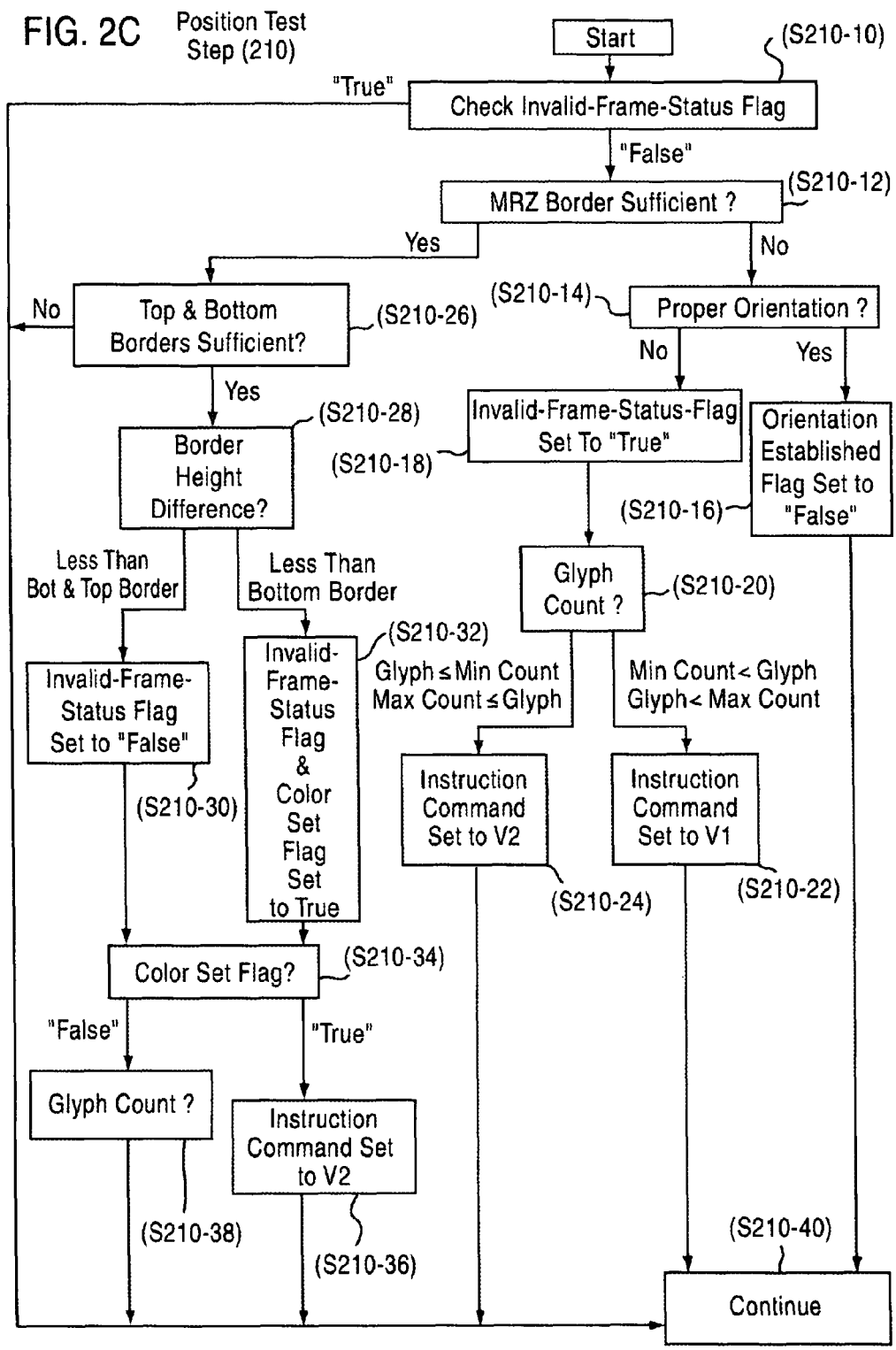

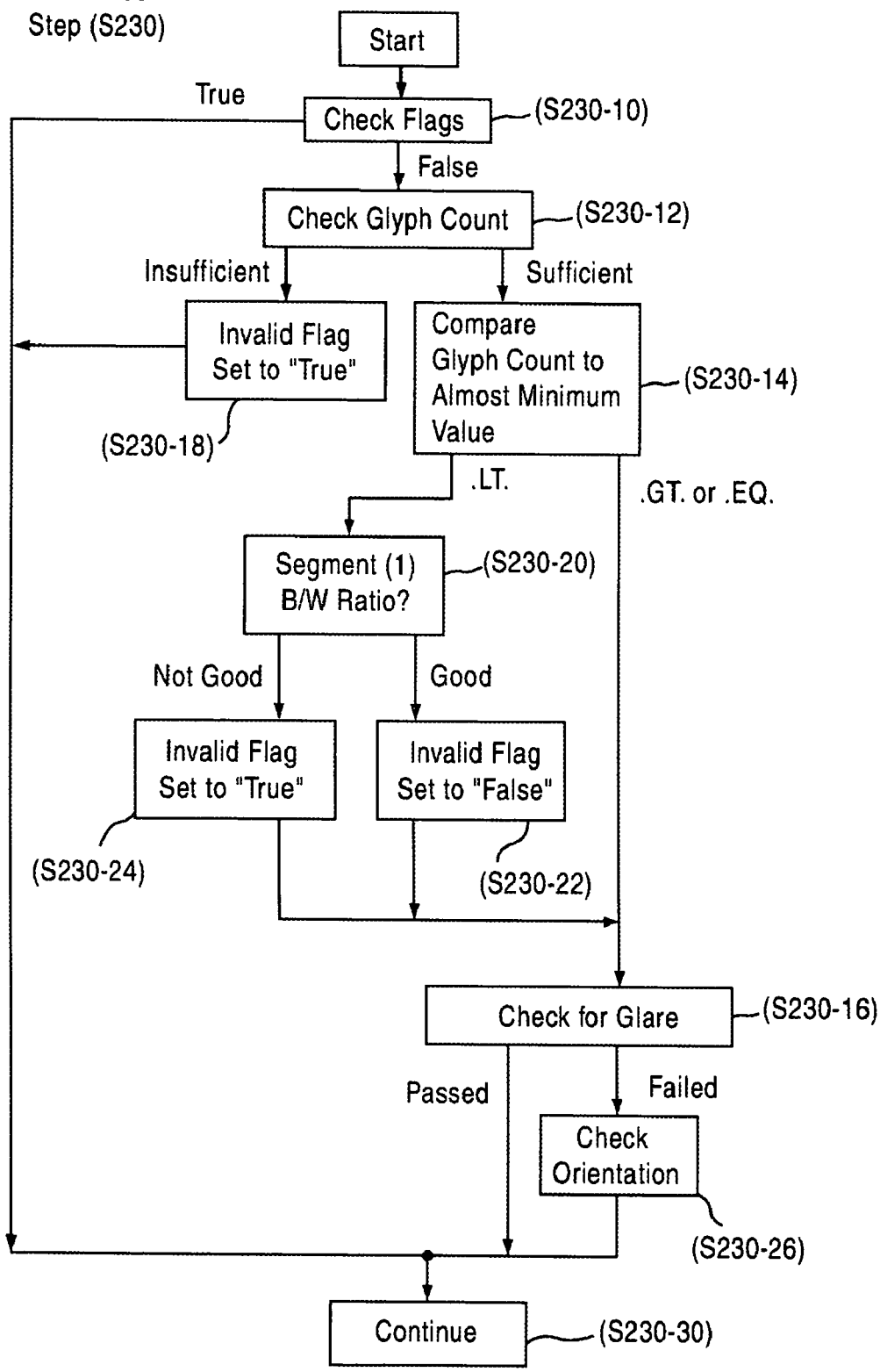

Test Evaluation Step (S250)

APPARATUS AND METHOD FOR DETECTION AND ANALYSIS OF IMAGERY

1. FIELD OF THE INVENTION

This invention relates generally to the detection and analysis of imagery and more particularly to an apparatus and method for the detection and analysis of imagery found within machine-readable zone of a document.

2. DESCRIPTION OF RELATED ART

Presently, conventional document readers (DR) may be used to capture, read, or scan a machine-readable document (MRD). However, the conventional document readers (DR) may be expensive and bulky. Thus, there is a need for a low cost, light-weight document reader (DR).

3. SUMMARY OF THE INVENTION

An apparatus and method for detecting and analyzing imagery, wherein the apparatus includes an image data acquisition means, an image data conversion means, and an adaptive thresholding means. The image data acquisition means acquires image data from a document. The acquired image data is converted into a grayscale image frame by the image data conversion means. In addition, the adaptive thresholding means converts the grayscale image frame into a bi-tonal frame.

4. BRIEF DESCRIPTION OF THE FIGURES

Other advantages of the invention will become apparent from a study of the specification and drawings in which:

FIG. 2A is a composite flow diagram illustrating the operation of the imagery apparatus.

FIG. 2B is a composite flow diagram illustrating a process for determining the average glyph height.

FIG. 2C is a composite flow diagram illustrating a process for determining the machine-readable zone boarder sufficiently.

FIG. 2D is a composite flow diagram illustrating a process for determining the presence or absence of glare.

Throughout the drawing figures, like reference numerals will be understood to refer to like parts and components.

5. DETAILED DESCRIPTION OF THE PREFERRED EMBODIMENTS

Figure 1A:
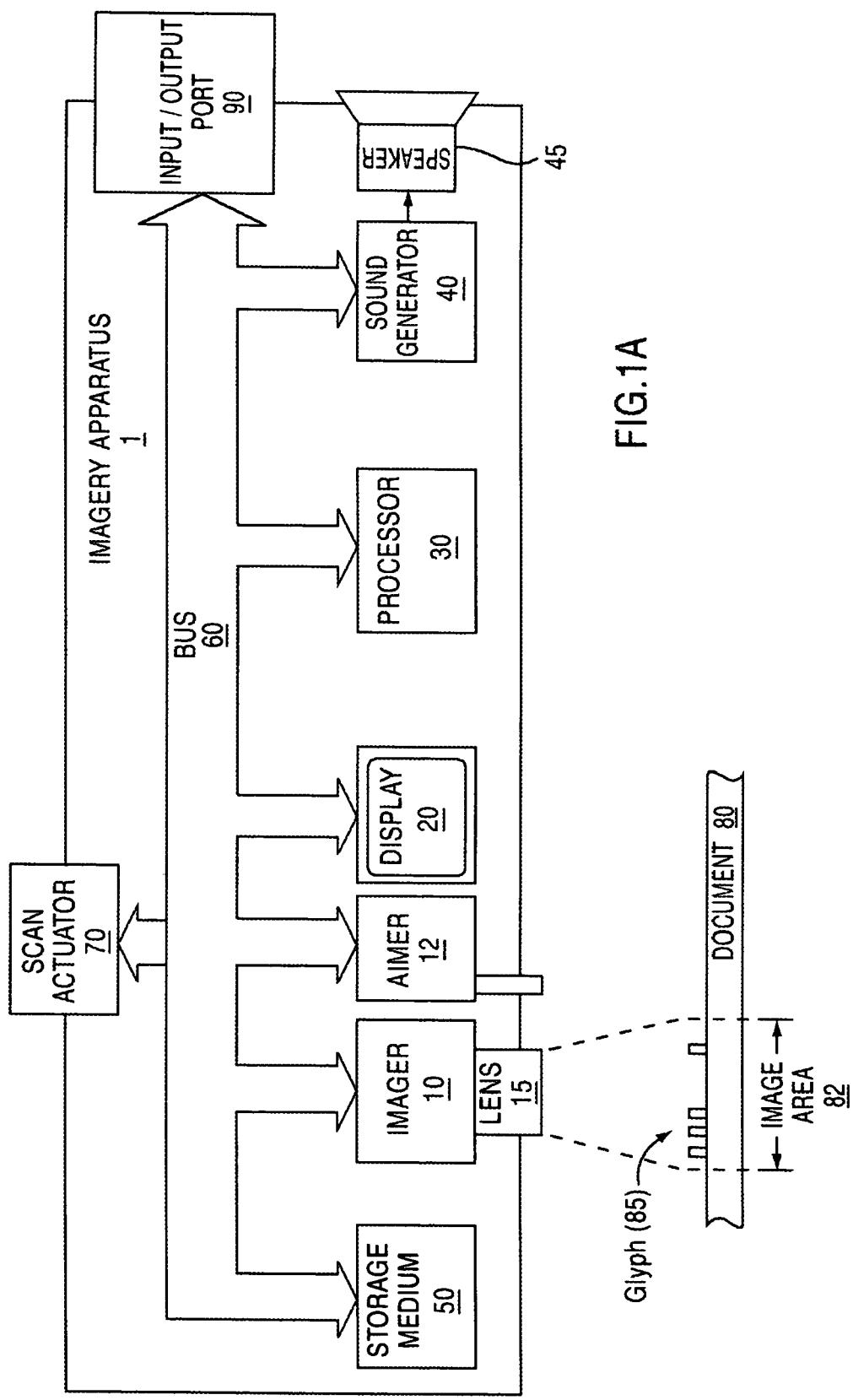
FIG. 1A is a block diagram illustrating the elements of an imagery apparatus.

Shown within FIG. 1A are the elements of an imagery apparatus (1). The imagery apparatus (1) is a document reader (DR). This imagery apparatus (1) may be integrated in a portable device used to electronically capture an image of the document (80). Elements of the imagery apparatus (1) may include an imager (10), an aimer (12), a lens (15), a display (20), a processor (30), a sound generator (40), a speaker (45), a storage medium (50), a bus (60), a scan actuator (70), and an input/output port (90). The imagery apparatus (1) may be a cellular phone, a keypad, a camera, a hand-held imager, or any electronic device adapted to capture electronic image data.

Also shown within FIG. 1A is a document (80). Document (80) may be a machine-readable document (MRD). A machine-readable document (MRD) is any document having data imprinted thereon. This data may be captured, read, or scanned using the imagery apparatus (1). Preferred examples of a machine-readable document (MRD) may include a bank check, a serial label, postal mail, and a machine-readable travel document (MRTD). Document (80) may be any document having at least one glyph (85) imprinted thereon.

A machine-readable travel document (MRTD) may be an international travel document that has machine-readable data imprinted thereon. Such an international travel document may include a government issued travel document. This government issued travel document can be a passport, a visa, a border crossing card, or any other machine-readable official travel document. Many countries currently issue, or have plans to issue, a machine-readable travel document (MRTD).

A machine-readable zone (MRZ) is an area of the machine-readable document (MRD) having the machine-readable data imprinted thereon for capture, reading, or scanning by the imagery apparatus (1). Machine-readable data having a standard format may be imprinted in the machine-readable zone (MRZ) for detection and identification by the imagery apparatus (1) using optical character recognition (OCR) software.

Figure 1B:
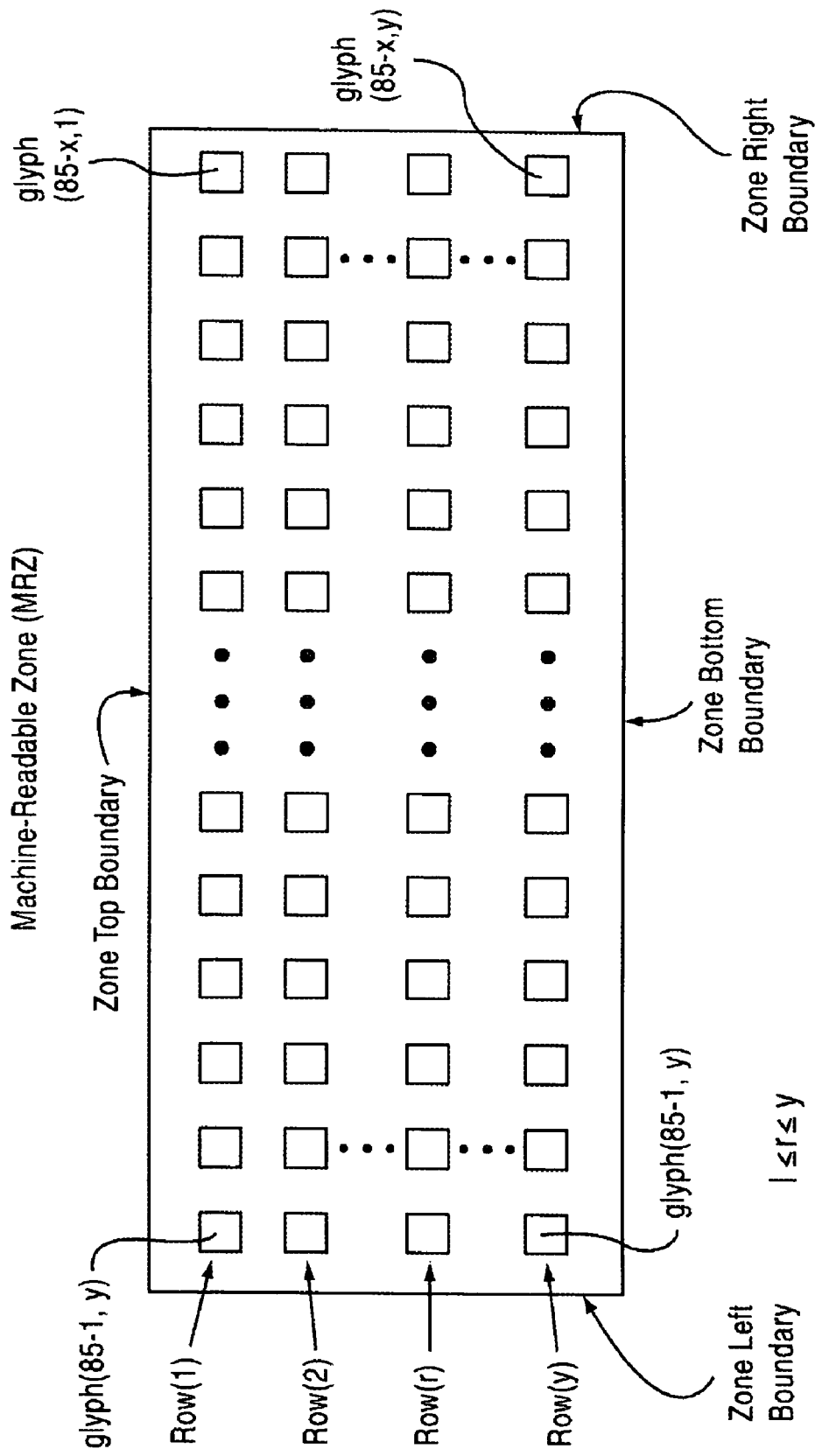
FIG. 1B is machine-readable zone having glyphs.

FIG. 1B depicts a machine-readable zone (MRZ) having glyphs (85). Glyphs (85) are shown in FIG. 1B as glyph (85-1,1) through glyph (85-$x,y$). The term "x" refers to an integer having a value of at least one, and is the total number of glyphs (85) located within a particular row (y). The term "r" refers to an integer having a value of at least one, and is the particular row number for a row of glyphs (85) located within the machine-readable zone (MRZ). The term "y" refers to an integer having a value of at least one, and is the total number of rows located within the machine-readable zone (MRZ). The term "y" is defined as the following:

$1 \leq r \leq y$

The total number of glyphs (85) located within a particular row (r) may be of a value different than the total number of glyphs (85) located within a row other than the row (r). A glyph (85) may vary from another glyph (85) in size or shape. Also, a glyph (85) may vary from another glyph (85) in color. Each of the glyphs (85) is an image object. This image object may be a symbol, a character, or a font. A plurality of pixels forming a glyph (85) is within the scope of the invention.

FIG. 2A is a composite flow diagram illustrating the operation of the imagery apparatus (1) in accordance with the present invention. This operation may be executable by the processor (30). The routines for performing the operation of the imagery apparatus (1) may be stored within the storage medium (50).

In step (S10), the lens (15) and the document (80) are positioned to permit the capture of image data by the imagery apparatus (1). Once the lens (15) and the document (80) are positioned in step (S10), the process control proceeds to step (S30).

During step (S30), data, flags and variables usable by the processor (30) may be initialized by the imagery apparatus (1). The scan actuator (70) may also be activated in step (S30).

An orientation-established-flag may be initialized by the imagery apparatus (1) during step (S30). The orientation-established-flag indicates the presence or absence within the imagery apparatus (1) of a machine-readable zone (MRZ) that has been verified by the processor (30) as meeting the criteria of having a proper orientation. The orientation-established-flag is initialized to a value of "FALSE". When set to value of "FALSE", the orientation-established-flag indicates the absence within the imagery apparatus (1) of a machine-readable zone (MRZ) that has been verified by the processor (30) as meeting the criteria of having a proper orientation.

An invalid-frame-status-flag is another of the variables that is initialized by the imagery apparatus (1) during step (S30). The invalid-frame-status-flag indicates the presence or absence within the imagery apparatus (1) of an image that has been verified by the processor (30) as meeting the criteria of having an acceptable glyph image frame. The invalid-frame-status-flag is initialized to a value of "TRUE" in step (S30). When set to value of "TRUE", the invalid-frame-status-flag indicates the absence within the imagery apparatus (1) of an image that has been verified by the processor (30) as meeting the criteria of having an acceptable image frame as described hereinbelow.

A forced-orientation-checked-flag indicates the presence or absence of verification by the processor (30) of orientation for a machine-readable zone (MRZ). The forced-orientation-checked-flag is initialized by the imagery apparatus (1) during step (S30) to a value of "FALSE". When set to value of "FALSE", the forced-orientation-checked-flag indicates the absence of verification by the processor (30) of orientation for a machine-readable zone (MRZ).

A color-set-flag denotes the presence or absence of an instruction command for use by the imagery apparatus (1). An instruction value (V) associated with the instruction command is as follows.

Instruction value (V1) may indicate that the machine-readable zone (MRZ) is within range but one of the rows (y) is clipped either in the vertical or in the horizontal. A correction of this condition may include the adjustment of the imagery apparatus (1) to better center the machine-readable zone (MRZ) within the image area (82).

Instruction value (V2) may indicate that no machine-readable zone (MRZ) could be found within the image area (82).

Instruction value (V3) may indicate that the imagery apparatus (1) is close to being positioned for proper reading of the machine-readable zone (MRZ), but final positioning of the imagery apparatus (1) such as nudge left, right, up or down is still necessary.

Instruction value (V4) may indicate that the angle of the document (80) is reflecting light back into the lens (15). This condition may cause glare or may cause too much of the machine-readable zone (MRZ) to be clipped. A correction of this condition may include the tilting the top of the document (80) towards or away from the user of the imagery apparatus (1). A correction of this condition may also include the tilting the bottom of the document (80) towards or away from the user of the imagery apparatus (1).

Instruction value (V5) may indicate that the imagery apparatus (1) is too close to the machine-readable zone (MRZ). A correction of this condition may include the repositioning of the imagery apparatus (1) further away from the document (80). A correction of this condition may also include the repositioning of the document (80) further away from the imagery apparatus (1).

Instruction value (V6) may indicate that the imagery apparatus (1) is too far from the machine-readable zone (MRZ). A correction of this condition may include the repositioning of the imagery apparatus (1) closer to the document (80). A correction of this condition may also include the repositioning of the document (80) closer to the imagery apparatus (1).

Instruction value (V7) may indicate that the machine-readable zone (MRZ) has been properly captured and that no repositioning or further adjustment of the imagery apparatus (1) is necessary.

Upon execution of an instruction command, the processor (30) may direct the display (20) to present the instruction value (V) as a visual instruction. The processor (30) may also direct the sound generator (40) to output the instruction value (V) to the speaker (45) as an audible instruction. The color-set-flag is initialized by the imagery apparatus (1) during step (S30) to a value of "FALSE". When set to value of "FALSE", the color-set-flag denotes the absence of an instruction command for use by the imagery apparatus (1).

A maximum top border value, a maximum left border value, and a maximum bottom border value may all be initialized during step (S30). Also during step (S30), a minimum top border value, a minimum left border value, and a minimum bottom border value may be initialized. A minimum permitted glyph low count, a minimum permitted glyph count, an almost-minimum permitted glyph count, a maximum permitted glyph count, and a maximum permitted glyph high count may also be initialized during step (S30). Each of these variables may have a value of zero or greater.

Also within the preferred embodiment the invention is the initialization of the exposure settings during step (S30). These exposure settings may include an image gain setting, a frame rate setting, and an exposure amount setting.

The aimer (12) is an optional feature of the imagery apparatus (1). If present, the aimer (12) is also illuminated during step (S30). The aimer (12) assists the user of the imagery apparatus (1) in aiming the lens (15) at the machine-readable zone (MRZ). In particular, the aimer (12) emits a light beam when illuminated. The endpoint of this light beam produces visible dot of light on the surface of the document (80) to highlight the vicinity of the document (80) where the optical axis of the lens (15) is directed.

Once the data and variables are initialized and the scan actuator (70) is activated, the process control proceeds to step (S50).

Within step (S50), the processor (30) tests the invalid-frame-status-flag. If the invalid-frame-status-flag has a value of "FALSE", then the invalid-frame-status-flag indicates the presence within the imagery apparatus (1) of an image that has been verified by the processor (30) as meeting the criteria of having an acceptable glyph image frame and process control proceeds to step (S290). But if the invalid-frame-status-flag has a value of "TRUE", then process control proceeds to step (S70).

Image data is acquired from the document (80) during an image data acquisition step (S70). In acquiring image data from the document (80), the imagery apparatus (1) may read or scan the document (80) to capture image data. The document (80) may be scanned or read for image data after the extinguishment of the light beam emitted from the aimer (12) when the aimer (12) is present and operational within the imagery apparatus (1). Specifically, a light beam may be emitted from the aimer (12) when the aimer (12) is present. In scanning for image data in step (S70), the lens (15) receives light reflected from the document (80). The imager (10) converts this light reflected from the document (80) into the image data. The image data being pixels is within the scope of the invention.

In step (S90), the processor (30) may extract an image frame from the image data. In particular, the image data acquired in step (S70) may be converted by the imager (10) into an image frame. The image frame may be a bitmap. The image frame may also be a streaming-video image having number of frames per second, a digital signal, an analog signal, or a still-frame image. After the extraction of the image frame from the image data, step (S90) may include conversion by the processor (30) of the image frame into a grayscale image frame. The term "grayscale" is an image frame that is defined by shades of gray. Specifically, pixels within the grayscale image frame are represented only by shades of gray. Such shades of gray may include the colors black and white. The acquisition of image data initiated during step (S70) is halted in step (S90) once the image frame is extracted from the image data. Also in step (S90), the aimer (12), if present, is illuminated once the scanning for image data is halted. After the extraction of an image frame from the image data in step (S90), process control proceeds to step (S110).

The processor (30) may perform an analysis of the image frame during step (S110) to determine whether or not the image frame captured by the imager (10) includes any data. Process control proceeds from step (S110) to step (S270) when the processor (30) determines that no data is found within the image frame. Conversely, process control proceeds from step (S110) to step (S130) when the processor (30) determines that data is found within the image frame.

In step (S130), the processor (30) may apply an adaptive thresholding algorithm to the image frame that has been extracted in step (S90). In particular, the adaptive thresholding algorithm of the present invention converts the extracted image frame into a bi-tonal frame. As a result of this conversion, the image area (82) may be converted into the bi-tonal image area (82). This conversion of the image area (82) into a bi-tonal frame enhances the binary contrast of the image frame. Conversion of the image area (82) into the bi-tonal frame may include changing the threshold value of each pixel within the image frame. The threshold value may be changed based on local brightness characteristics. The bi-tonal frame has only two tones of color. One of these two tones of color is a foreground color and the other of these two tones of color is a background color. This bi-tonal frame may have one-bit-per-pixel, wherein a single bit is used to represent the pixel. The two tones of color may be represented by the single bit. If the image frame extracted in step (S90) cannot be converted using the adaptive thresholding algorithm of into a bi-tonal frame, then the process control proceeds to step (S270). Otherwise, if the adaptive thresholding algorithm converts the image frame extracted in step (S90) into a bi-tonal frame, the invalid-frame-status-flag is set to a value of "FALSE" and the process control proceeds to step (S150). The invalid-frame-status-flag having a value of "FALSE" in step (S130) indicates the presence within the imagery apparatus (1) of an image area (82) that has been verified by the processor (30) as meeting the criteria of being an acceptable bi-tonal frame.

The machine-readable zone parameters may be initialized in step (S150). These parameters may include, but are not limited to, the number of glyphs (85) within the machine-readable zone (MRZ), the average height of the glyphs (85), the black to white ratio around the center of the machine-readable zone (MRZ), the width and length of the machine-readable zone (MRZ), and the minimum border size around the machine-readable zone (MRZ). The process control proceeds to step (S170).

The processor (30) may perform a machine-readable zone (MRZ) test in step (S170). This machine-readable zone (MRZ) test determines whether or not the machine-readable zone (MRZ) associated with the bi-tonal tonal image area (82) is an acceptable machine-readable zone (MRZ). In this regard, the area in the machine-readable zone (MRZ) must be of a sufficient size. This determination within step (S170) may include testing whether or not the machine-readable zone (MRZ) is empty. Being empty is when the machine-readable zone (MRZ) has no area. Having no area is when the coordinate for the right side of the machine-readable zone (MRZ) is less than or equal to the coordinate for the left side of the side of the machine-readable zone (MRZ), or when the coordinate for the top side of the machine-readable zone (MRZ) is less than or equal to the coordinate for the bottom side of the side of the machine-readable zone (MRZ). In the event that the machine-readable zone (MRZ) is empty, the processor (30) in step (S170) sets the color-set-flag to a value of "TRUE", assigns an instruction value (V2) as the instruction command, and sets the invalid-frame-status-flag to a value of "TRUE". The process control then proceeds from step (S170) to step (S190).

Otherwise, the processor (30) in step (S170) may perform a black-to-white ratio test on the bi-tonal image area (82) upon a determination that the machine-readable zone (MRZ) is not empty.

Figure 4:
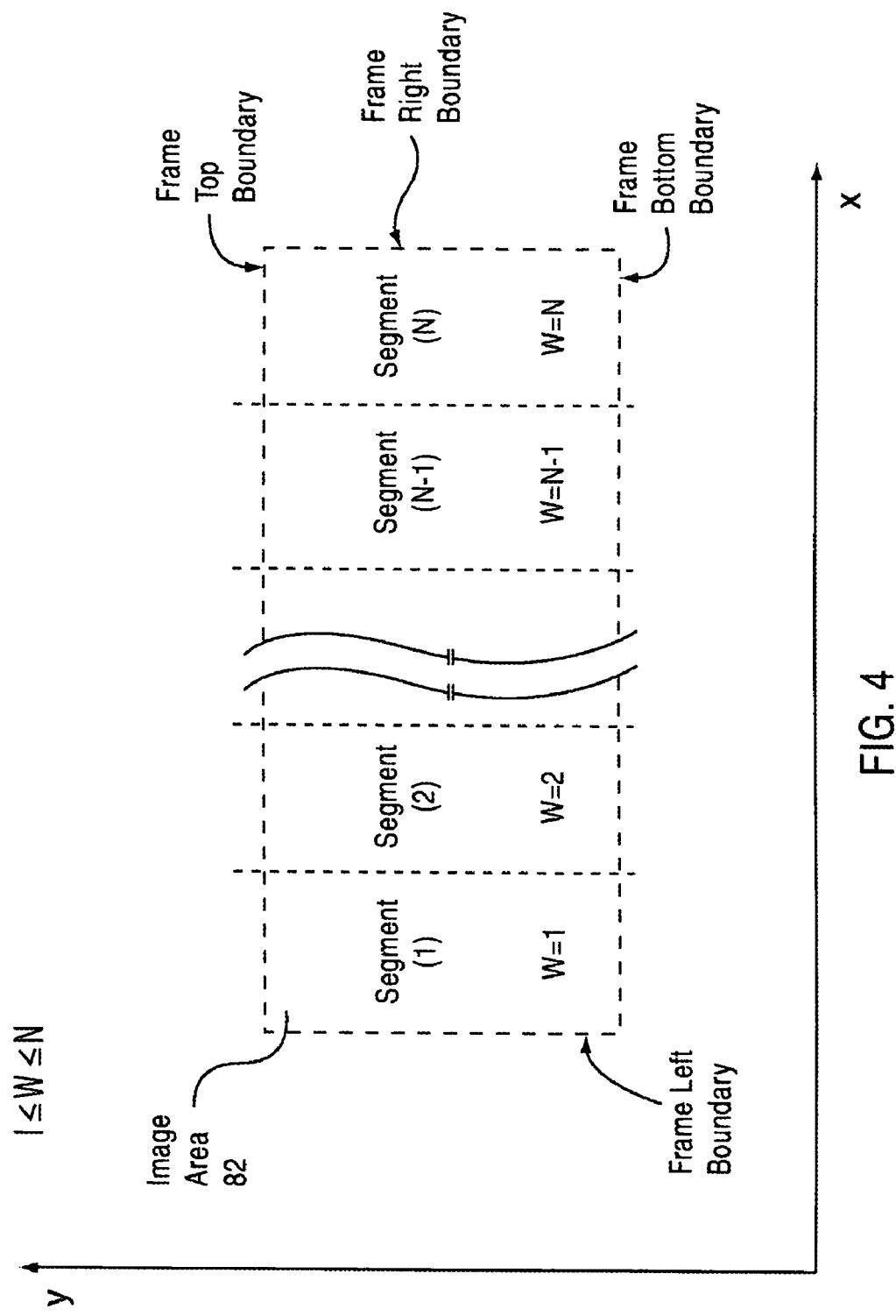
FIG. 4 shows a partitioning of the bi-tonal image area into segments.

Specifically, as previously described herein, the adaptive thresholding algorithm converts the extracted image frame into a bi-tonal image area (82). Pixels within this bi-tonal image area (82) have only two tones of color. The first of these two tones of color is a foreground color and the other of these two tones of color is a background color. FIG. 4 shows a partitioning of the bi-tonal image area (82) into segment (1) through segment (N). The predetermined total number of segments located within the bi-tonal image area (82) may be initialized within step (S30). The calculated black-to-white ratio for segment (W) is as follows in equation (1):

$$\text{SEGMENT } (W) \text{ RATIO} = \frac{(\text{NUMBER OF SEGMENT } (W) \text{ FOREGROUND PIXELS}) \times 100}{(\text{TOTAL PIXELS WITHIN IMAGE AREA})}$$

wherein, within equation (1):
N=a predetermined total number of segments located within the bi-tonal image area (82);
W=the segment number located within the image area (82), as depicted within FIG. 4;
$1 \leq W \leq N$;
SEGMENT (W) RATIO=the calculated black-to-white ratio for segment (N);
NUMBER OF SEGMENT (W) FOREGROUND PIXELS=the total number of pixels having a foreground color within segment (W); and
TOTAL PIXELS WITHIN IMAGE AREA=the total number of pixels within the image area (82).

In performing a black-to-white ratio test on the bi-tonal image area (82), the processor (30) in step (S170) may initialize the number of segments (N) located within the bi-tonal image area (82) to four (4) segments. The processor (30) in step (S170) initializing the number of segments (N) located within the bi-tonal image area (82) to a number other than four (4) segments is also within the scope of the invention. When the number of segments (N) located within the bi-tonal image area (82) is four (4) segments, this black-to-white ratio test in step (S170) may include testing the black-to-white ratio at segment (1), segment (2), segment (3), and segment (4). Segment (1), as shown in FIG. 4, may be the leftmost portion of the bi-tonal image area (82). Segment (2), as shown in FIG. 4, may be the left-center portion of the bi-tonal image area (82). Segment (3), as shown in FIG. 4, may be the right-center portion of the bi-tonal image area (82). Segment (4), as shown in FIG. 4, may be the rightmost portion of the bi-tonal image area (82). If any of the black-to-white ratio at the leftmost portion, the black-to-white ratio at the left-center portion, the black-to-white ratio at the right-center portion, and the black-to-white ratio at the rightmost portion is outside of an acceptable predetermined limit, then the processor (30) sets the color-set-flag to a value of "TRUE", assigns an instruction value (V2) as the instruction command, and sets the invalid-frame-status-flag to a value of "TRUE". The process control then proceeds from step (S170) to step (S190).

A size test is performed by the processor (30) in step (S190), as shown in FIG. 2B. The step (S190) indicates the presence within the imagery apparatus (1) of an image that has been verified by the processor (30) as meeting the criteria of having an acceptable bi-tonal image area (82). Specifically, this size test of step (S190) determines whether or not the glyphs (85) found within the machine-readable zone (MRZ) are of an acceptable average height.

Initially within step (S190-10), the processor (30) determines the status of the invalid-frame-status-flag. Process control proceeds to a process continue step (S190-40) if the processor (30) determines in step (S190-10) that the status of the invalid-frame-status-flag is set to a value of "TRUE". This process continue step (S190-40) returns process control to step (S210).

If the processor (30) determines in step (S190-10) that the status of the invalid-frame-status-flag is set to a value of "FALSE", then the processor (30) determines in step (S190-12) whether or not the average height of the glyphs (85) is less than a predetermined minimum average glyph height or greater than a predetermined maximum average glyph height. The average height of the glyphs (85) may be used to determine whether or not the lens (15) is either too close or too far from the document (80). The processor (30) in step (S190-12) calculates the average height of the glyphs (85) in determining whether or not the average height of the glyphs (85) is less than a predetermined minimum average glyph height or greater than a predetermined maximum average glyph height.

When the processor (30) is step (S190-12) determines that the average height of the glyphs (85) is greater than a predetermined maximum average glyph height, then the processor (30) in step (S190-14) sets the color-set-flag to a value of "TRUE", assigns an instruction value (V5) as the instruction command, sets the invalid-frame-status-flag to a value of "TRUE". The process control then proceeds from step (S190-14) to a process continue step (S190-40). This process continue step (S190-40) returns process control to step (S210).

Conversely, when the processor (30) in step (S190-12) determines that the average height of the glyphs (85) is less than a predetermined minimum average glyph height, then the processor (30) in step (S190-16) sets the color-set-flag to a value of "TRUE", assigns an instruction value (V2) as the instruction command, sets the invalid-frame-status-flag to a value of "TRUE", and determines whether or not the number of glyphs (85) present within the machine-readable zone (MRZ) is greater than the minimum permitted glyph count but less than the maximum permitted glyph count. The processor (30) in step (S190-18) assigns an instruction value (V6) as the instruction command upon the determination that the number of glyphs (85) present within the machine-readable zone (MRZ) is greater than the minimum permitted glyph count but less than the maximum permitted glyph count, and otherwise in step (S190-20) assigns an instruction value (V1) as the instruction command upon the determination that the number of glyphs (85) present within the machine-readable zone (MRZ) is less than or equal to the minimum permitted glyph count or is greater than or equal to the maximum permitted glyph count. The process control then proceeds to a process continue step (S190-40). This process continue step (S190-40) returns process control to step (S210).

When the processor (30) is step (S190-12) determines that the average height of the glyphs (85) is greater than or equal to the predetermined minimum average glyph height but less than or equal to the predetermined maximum average glyph height, the process control then proceeds to a process continue step (S190-40). This process continue step (S190-40) returns process control to step (S210).

A position test is performed by the processor (30) in step (S210), which may include a determination by the processor (30) as to whether or not the area bordering the machine-readable zone (MRZ) is of a sufficient size. FIG. 2C is a composite flow diagram illustrating the process of step (S210).

As shown in FIG. 2C, step (S210-10) may include a determination of the initial value in step (S210) by the processor (30) of the invalid-frame-status-flag. Process control proceeds to a process continue in step (S210-40) if the processor (30) determines in step (S210-10) that the status of the invalid-frame-status-flag is set to a value of "TRUE". This process continue step (S210-40) returns process control to step (S230). The invalid-frame-status-flag having a value of "TRUE" in step (S210) may indicate the absence within the imagery apparatus (1) of an image that has been verified by the processor (30) as meeting the criteria of having an acceptable bi-tonal image area (82). The invalid-frame-status-flag having a value of "TRUE" in step (S210-10) may also indicate the absence within the imagery apparatus (1) of an image that has been verified by the processor (30) as meeting the criteria of having the average height of the glyphs (85) being greater than a predetermined minimum average glyph height but less than a predetermined maximum permitted glyph height.

The invalid-frame-status-flag having an initial value of "FALSE" in step (S210-10) may indicate the presence within the imagery apparatus (1) of an image that has been verified by the processor (30) as meeting the criteria of having an acceptable bi-tonal image area (82), and as meeting the criteria of having the average height of the glyphs (85) that is greater than a predetermined minimum average glyph height but less than a predetermined maximum permitted glyph height.

If the processor (30) determines in step (S210-10) that the status of the invalid-frame-status-flag is set to an initial value of "FALSE", then the processor (30) determines in step (S210-12) whether or not the area bordering the machine-readable zone (MRZ) is of a sufficient size. To determine in step (S210-12) whether or not the area bordering the machine-readable zone (MRZ) is of a sufficient size, the processor (30) compares the position of the of the frame boundary for the bi-tonal image area (82) to the zone boundary for the machine-readable zone (MRZ).

Figure 3A:
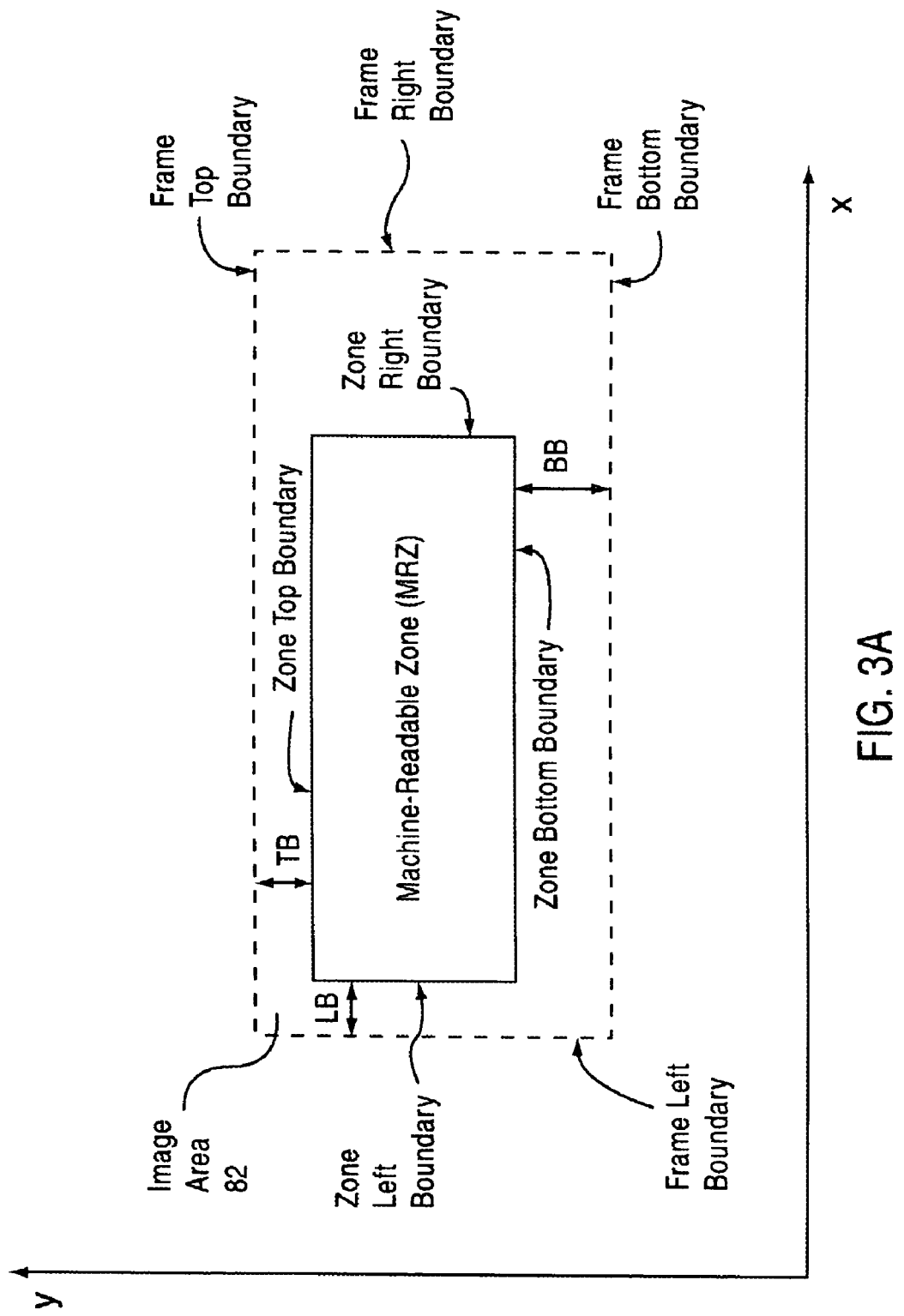
FIG. 3A is a machine-readable zone bounded within an image area.
Figure 3B:
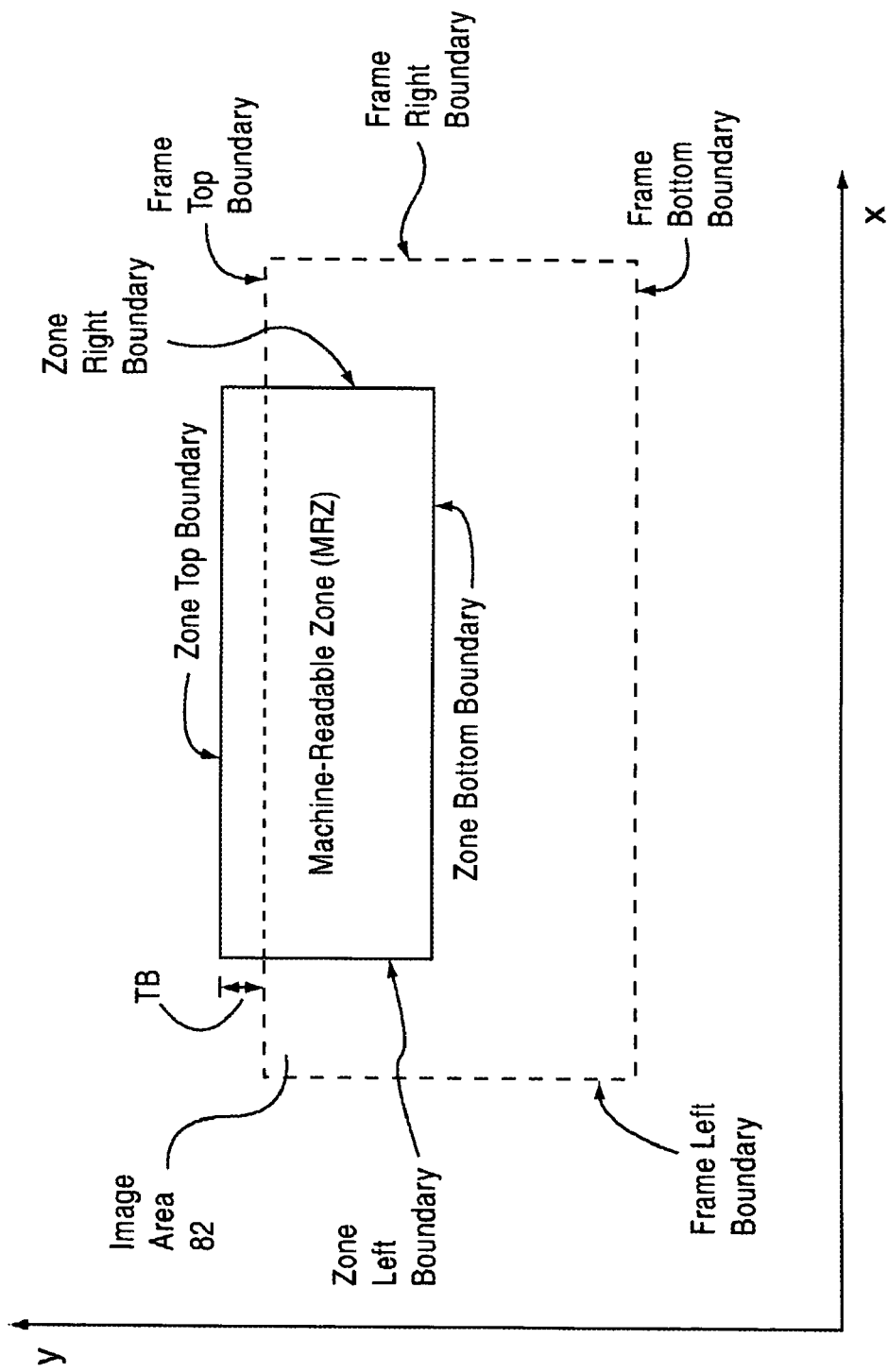
FIG. 3B is the zone top boundary of the machine-readable zone extending beyond the frame top boundary of the image area.
Figure 3C:
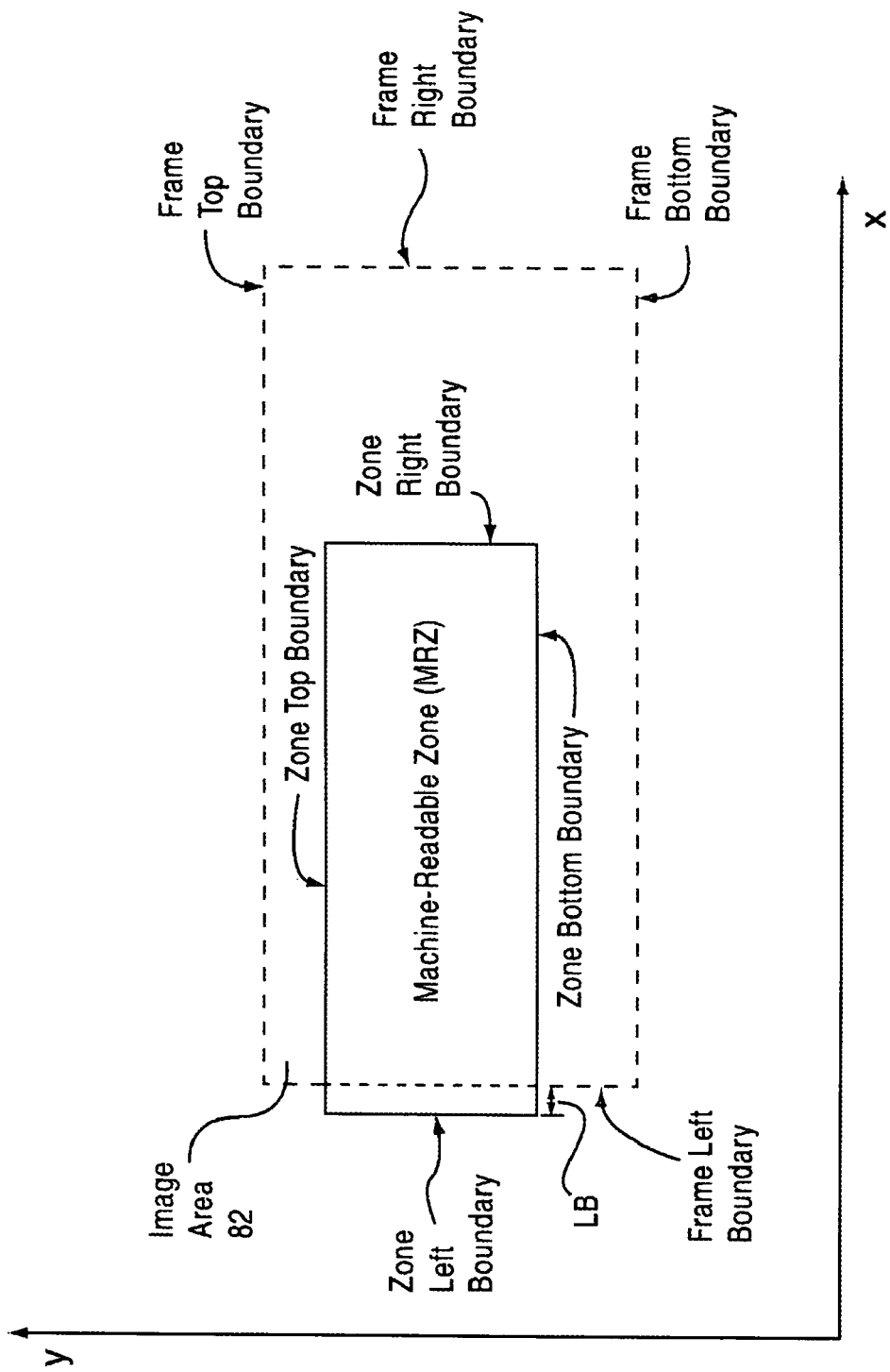
FIG. 3C is the zone left boundary of the machine-readable zone extending beyond the frame left boundary of the image area.
Figure 3D:
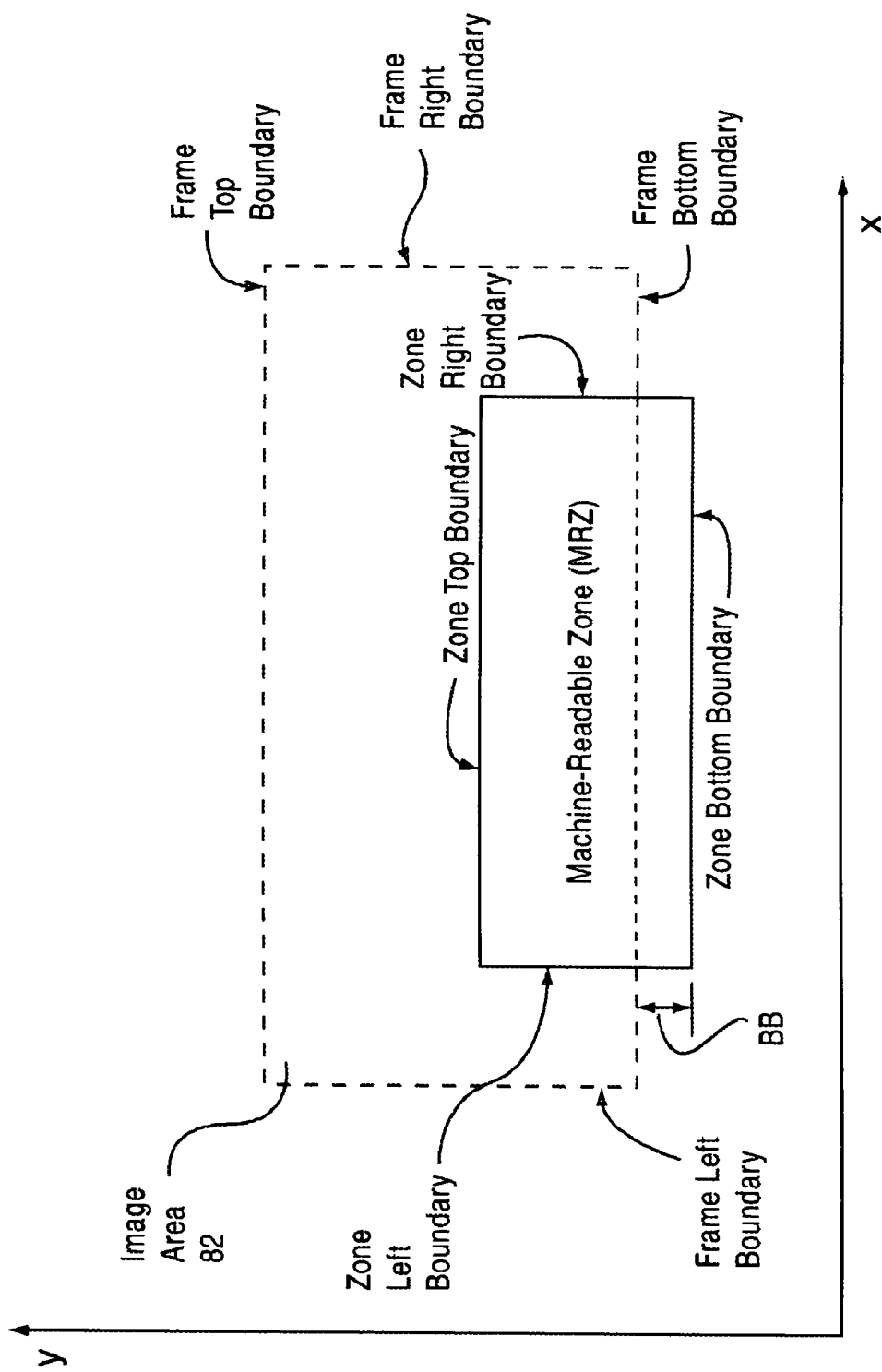
FIG. 3D is the zone bottom boundary of the machine-readable zone extending beyond the frame bottom boundary of the image area.

FIG. 3A depicts a machine-readable zone (MRZ) bounded within the bi-tonal image area (82) captured by the lens (15). The machine-readable zone (MRZ) may typically have a substantially quadrilateral shape. Shown within FIG. 3A is a top border (TB), which is depicted as the distance between the zone top boundary of the machine-readable zone (MRZ) and the frame top boundary of the bi-tonal image area (82). FIG. 3B depicts the zone top boundary of the machine-readable zone (MRZ) extending beyond the frame top boundary of the bi-tonal image area (82). The processor (30) assigns a non-negative value to the top border (TB) when the zone top boundary of the machine-readable zone (MRZ) does not extend beyond the frame top boundary of the bi-tonal image area (82), as shown in FIG. 3A. The processor (30) assigns a negative value to the top border (TB) when the zone top boundary of the machine-readable zone (MRZ) extends beyond the frame top boundary of the bi-tonal image area (82), as shown in FIG. 3B. Further depicted within FIG. 3A is a left border (LB) as the distance between the zone left boundary of the machine-readable zone (MRZ) and the frame left boundary of the bi-tonal image area (82). FIG. 3C depicts the zone left boundary of the machine-readable zone (MRZ) extending beyond the frame left boundary of the bi-tonal image area (82). The processor (30) assigns a non-negative value to the left border (LB) when the zone left boundary of the machine-readable zone (MRZ) does not extend beyond the frame left boundary of the bi-tonal image area (82), as shown in FIG. 3A. The processor (30) assigns a negative value to the left border (LB) when the zone left boundary of the machine-readable zone (MRZ) extends beyond the frame left boundary of the bi-tonal image area (82), as shown in FIG. 3C. A bottom border (BB) is depicted within FIG. 3A as the distance between the zone bottom boundary of the machine-readable zone (MRZ) and the frame bottom boundary of the bi-tonal image area (82). FIG. 3D depicts the zone bottom boundary of the machine-readable zone (MRZ) extending beyond the frame bottom boundary of the bi-tonal image area (82). The processor (30) assigns a non-negative value to the bottom border (BB) when the zone bottom boundary of the machine-readable zone (MRZ) does not extend beyond the frame bottom boundary of the bi-tonal image area (82), as shown in FIG. 3A. However, the processor (30) assigns a negative value to the bottom border (LB) when the zone bottom boundary of the machine-readable zone (MRZ) extends beyond the frame bottom boundary of the bi-tonal image area (82), as shown in FIG. 3D.

The processor (30) determines in step (S210-12) whether or not the top border (TB) is less than the minimum top border value, whether or not the left border (LB) is less than the minimum left border value, and whether or not the bottom border (BB) is less than the minimum bottom border value. Process control proceeds from step (S210-12) to step (S210-14) when the processor (30) determines in step (S210-12) for any of the top border (TB), the left border (LB), and the bottom border (BB) that the top border (TB) is less than the minimum top border value, that the left border (LB) is less than the minimum left border value, or that the bottom border (BB) is less than the minimum bottom border value.

In step (S210-14), the processor (30) determines whether or not the machine-readable zone (MRZ) is a properly orientated within the bi-tonal image area (82). An orientation-established-flag is initialized by the imagery apparatus (1) during step (S30) to a value of "FALSE". When set to value of "FALSE", the orientation-established-flag indicates the absence within the imagery apparatus (1) of a machine-readable zone (MRZ) that has been verified by the processor (30) as meeting the criteria of having a proper orientation.

The forced-orientation-checked-flag is set to a value of "TRUE" in step (S210-16) by the processor (30) if the processor (30) determines in step (S210-14) that the orientation-established-flag is "FALSE", that the top border (TB) is greater than or equal to the minimum top border value, and that the bottom border (BB) is greater than or equal to the minimum bottom border value. Process control proceeds from step (S210-16) to a process continue in step (S210-40). Step (S210-40) returns process control to step (S230) of FIG. 2A.

Otherwise, the invalid-frame-status-flag is set to a value of "TRUE" in step (S210-18) by the processor (30) if the processor (30) determines in step (S210-14) that the orientation-established-flag is "TRUE", or that the top border (TB) is less than the minimum top border value, or that the bottom border (BB) is less than the minimum bottom border value. Process control proceeds from step (S210-18) to step (S210-20).

In step (S210-20), the processor (30) determines whether or not the number of glyphs (85) present within the machine-readable zone (MRZ) is greater than or less than the minimum permitted glyph count, and determines whether or not the number of glyphs (85) present within the machine-readable zone (MRZ) is greater than or less than the maximum permitted glyph count.

Process control proceeds from step (S210-20) to a process continue in step (S210-22) when the processor (30) determines in step (S210-20) that the number of glyphs (85) present within the machine-readable zone (MRZ) is greater than the minimum permitted glyph count, but less than the maximum permitted glyph count. The processor (30) in step (S210-22) sets the color-set-flag to a value of "TRUE" and assigns an instruction value (V1) as the instruction command. Process control proceeds from step (S210-22) to a process continue in step (S210-40). Step (S210-40) returns process control to step (S230).

Process control proceeds from step (S210-20) to a process continue in step (S210-24) when the processor (30) determines in step (S210-20) that the number of glyphs (85) present within the machine-readable zone (MRZ) is less than or equal to the minimum permitted glyph count, or greater than or equal to the maximum permitted glyph count. The processor (30) in step (S210-20) sets the color-set-flag to a value of "TRUE" and assigns an instruction value (V2) as the instruction command. Process control proceeds from step (S210-24) to a process continue in step (S210-40). Step (S210-40) returns process control to step (S230).

Process control proceeds to step (S210-26) when the border for the machine-readable zone (MRZ) has been determined to be sufficient within step (S210-12). In particular, process control proceeds from step (S210-12) to step (S210-26) when the processor (30) determines in step (S210-12) for any of the top border (TB), the left border (LB), and the bottom border (BB) that the top border (TB) is greater than or equal to the minimum top border value, that the left border (LB) is greater than or equal to the minimum left border value, or that the bottom border (BB) is greater than or equal to the minimum bottom border value.

The processor (30) determines in step (S210-26) whether or not the top border (TB) is greater than the maximum top border value, and whether or not the bottom border (BB) is greater than the maximum bottom border value. Process control proceeds from step (S210-26) to a process continue in step (S210-40) if the processor (30) determines in step (S210-

26) that the top border (TB) is less than or equal to the maximum top border value, and that the bottom border (BB) is less than or equal to the maximum bottom border value. Step (S210-40) returns process control to step (S230). In addition, process control proceeds from step (S210-26) to step (S210-28) if the processor (30) determines in step (S210-26) that the top border (TB) is greater than the maximum top border value, or that the bottom border (BB) is greater than the maximum bottom border value.

In step (S210-28), the processor (30) may perform a subtraction with the absolute value of the subtraction result being the height difference. The top border (TB) may be either the subtrahend or the minuend. Moreover, the bottom border (BB) being either the minuend or the subtrahend is additionally within the scope of the invention.

Process control proceeds from step (S210-28) to step (S210-30) if the height difference is less than both the top border (TB) and the bottom border (BB). The invalid-frame-status-flag is set to "FALSE" in step (S210-30). Process control then proceeds from step (S210-30) to step (S210-34). But if the height difference is greater than or equal to the top border (TB), or if the height difference is greater than or equal to the bottom border (BB) process control proceeds from step (S210-28) to step (S210-32). The processor (30) in step (S210-32) sets the invalid-frame-status-flag to "TRUE" and sets the color-set-flag to a value of "TRUE". Process control then proceeds from step (S210-32) to step (S210-34).

The processor (30) determines in step (S210-34) whether or not the color-set-flag is set to a value of "TRUE". The processor (30) in step (S210-34) assigns an instruction value (V2) as the instruction command when the processor (30) determines in step (S210-34) that the color-set-flag is set to a value of "TRUE". Process control then proceeds from step (S210-34) to step (S210-36).

In step (S210-36), the processor (30) determines whether or not the number of glyphs (85) present within the machine-readable zone (MRZ) is greater than or less than the minimum permitted glyph count, and determines whether or not the number of glyphs (85) present within the machine-readable zone (MRZ) is greater than or less than the maximum permitted glyph count. Specifically, the processor (30) in step (S210-36) assigns an instruction value (V3) as the instruction command when the processor (30) determines in step (S210-36) that the lens (15) is close to the document (80). The processor (30) determines in step (S210-36) that the lens (15) is close to the document (80) when the number of glyphs (85) present within the machine-readable zone (MRZ) is greater than the minimum permitted glyph count, but less than the maximum permitted glyph count. Process control then proceeds from step (S210-36) to step (S210-38).

In step (S210-38), the processor (30) determines whether or not the number of glyphs (85) present within the machine-readable zone (MRZ) is greater than or less than the minimum permitted glyph low count, and determines whether or not the number of glyphs (85) present within the machine-readable zone (MRZ) is greater than or less than the maximum permitted glyph high count. Specifically, the processor (30) in step (S210-38) assigns an instruction value (V1) as the instruction command when the processor (30) determines in step (S210-38) that the lens (15) is almost too close to the document (80). The processor (30) determines in step (S210-38) that the lens (15) is almost too close to the document (80) when the number of glyphs (85) present within the machine-readable zone (MRZ) is greater than the minimum permitted glyph low count, but less than the maximum permitted glyph high count. Process control then proceeds from step (S210-38) to the process continue step (S210-40). This process continue step (S210-40) returns process control to step (S230).

Step (S230) provides a glare test. FIG. 2D is a composite flow diagram illustrating the process of step (S230). In step (S230-10), the processor (30) determines whether or not the invalid-frame-status-flag or the color-set-flag is set to a value of "FALSE". Process control proceeds from step (S230-10) to the process continue step (S230-30) if the invalid-frame-status-flag and the color-set-flag are both set to a value of "TRUE". This process continue step (S230-30) returns process control to step (S250). But if either the invalid-frame-status-flag or the color-set-flag is set to a value of "FALSE", then process control proceeds from step (S230-10) to the process continue step (S230-12).

The processor (30) in step (S230-12) determines whether or not the correct number of glyphs (85) are present within the machine-readable zone (MRZ). Specifically, in step (S230-12), the processor (30) determines whether or not the number of glyphs (85) present within the machine-readable zone (MRZ) is less than the minimum permitted glyph count, and also determines whether or not the number of glyphs (85) present within the machine-readable zone (MRZ) is greater than the maximum permitted glyph count.

Process control proceeds from step (S230-12) to step (S230-14) when the processor (30) determines in step (S230-12) that the number of glyphs (85) present within the machine-readable zone (MRZ) is greater than or equal to the minimum permitted glyph count but less than or equal to the maximum permitted glyph count. The processor (30) in step (S230-14) determines whether or not the number of glyphs (85) present within the machine-readable zone (MRZ) is less than the almost-minimum permitted glyph count.

Process control then proceeds from step (S230-12) to step (S230-18) when the processor (30) determines in step (S230-12) that the number of glyphs (85) present within the machine-readable zone (MRZ) is either less than the minimum permitted glyph count or greater than the maximum permitted glyph count. The invalid-frame-status-flag is set to "TRUE" in step (S230-18). Process control then proceeds from step (S230-18) to the process continue step (S230-30). This process continue step (S230-30) returns process control to step (S250).

Process control proceeds from step (S230-14) to step (S230-20) when the processor (30) determines in step (S230-14) that the number of glyphs (85) present within the machine-readable zone (MRZ) is less than the almost-minimum permitted glyph count.

The total number of segments (N) located within the bi-tonal image area (82) for step (S230) may be the same number of segments as previously described in step (S170). Alternatively, the total number of segments (N) located within the bi-tonal image area (82) for step (S230) may be a number other than the segments as previously described in step (S170).

Figure 3E:
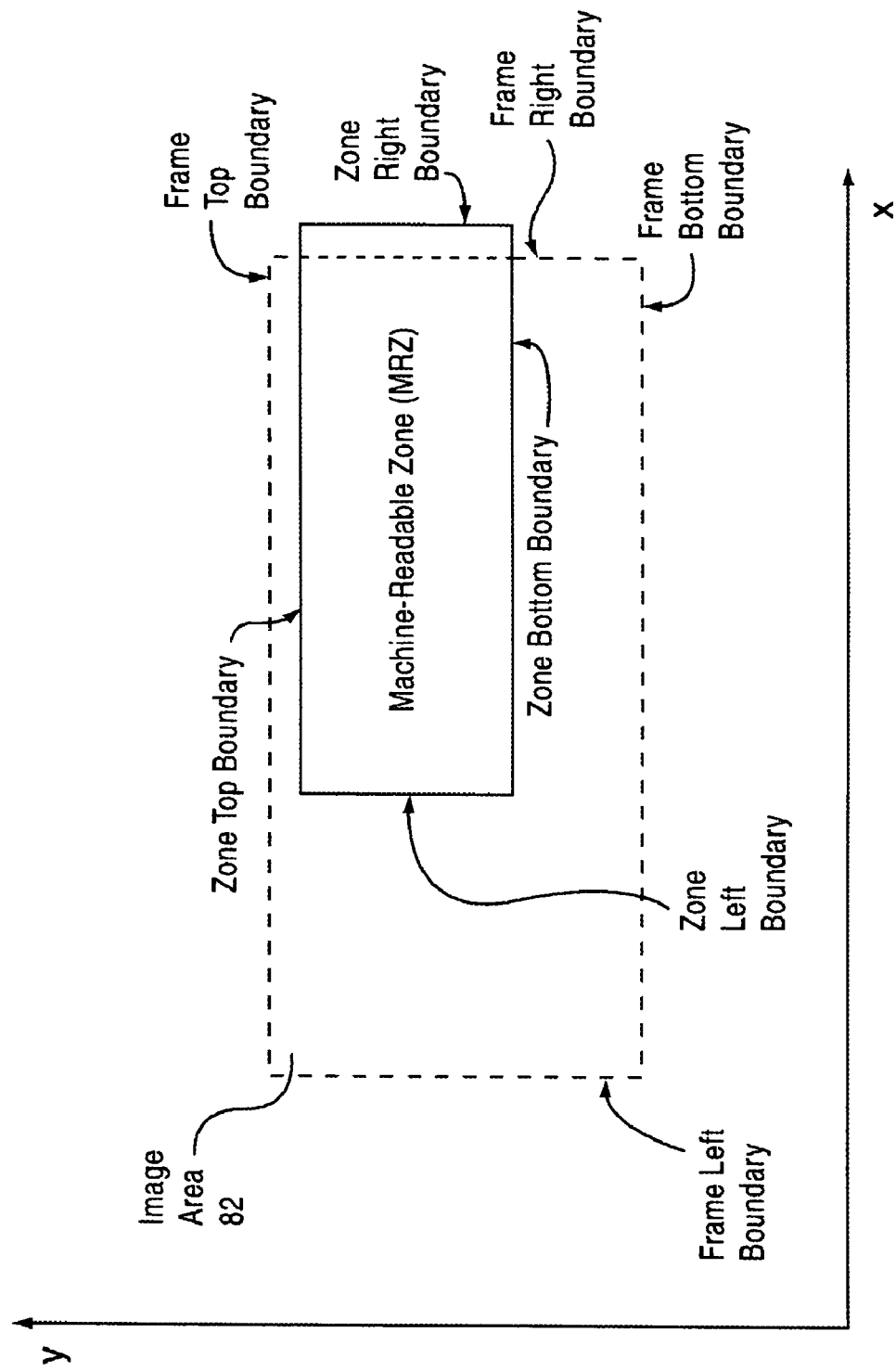
FIG. 3E is the zone right boundary of the machine-readable zone extending beyond the frame right boundary of the image area.

The processor (30) in step (S230-20) determines whether or not a calculated black-to-white ratio for segment (1) is less than a predetermined nominal expected black-to-white ratio for segment (1). Process control proceeds from step (S230-20) to step (S230-22) when the processor (30) determines that the calculated black-to-white ratio for segment (1) is less than the predetermined nominal expected segment (1) black-to-white ratio. A predetermined nominal expected black-to-white ratio for segment (W) sets forth an acceptable percentage amount of pixels within segment (W) having a foreground color to the total number of pixels within the bi-tonal image area (82). The predetermined nominal expected black-to-white ratio may be initialized within step (S30). The invalidframe-status-flag is set to "TRUE" in step (S230-22). The invalid-frame-status-flag being set to "TRUE" in step (S230-22) may indicate the presence within the imagery apparatus (1) of a machine-readable zone (MRZ) having the zone right boundary of the machine-readable zone (MRZ) extending beyond the frame right boundary of the bi-tonal image area (82), as shown in FIG. 3E. Process control then proceeds from step (S230-22) to the process continue step (S230-16).

Otherwise, process control proceeds from step (S230-20) to step (S230-24) when the processor (30) determines that the calculated black-to-white ratio for segment (1) is greater than or equal to the predetermined nominal expected segment (1) black-to-white ratio. The invalid-frame-status-flag is set to "FALSE" in step (S230-24). Process control then proceeds from step (S230-24) to the process continue step (S230-16).

Using equation (1), the processor (30) in step (S230-16) determines whether or not a calculated black-to-white ratio for each segment (2) through segment (N) is greater than or equal to a respective predetermined nominal expected black-to-white ratio for each segment (2) through segment (N) when more than one segment is located within the bi-tonal image area (82) (1<W). In particular, this check for glare may be performed by calculating the black-to-white ratio at segments of the bi-tonal image area (82). The segments where the calculated black-to-white ratios are calculated may include a left portion of the bi-tonal image area (82), a left-center portion of the bi-tonal image area (82), a right-center portion of the bi-tonal image area (82), and a right portion of the bi-tonal image area (82).

The processor (30) in step (S230-16) sets the invalid-frame-status-flag to "TRUE" and sets the color-set-flag to a value of "FALSE" when the processor (30) determines in step (S230-16) that the calculated black-to-white ratio for each segment (2) through segment (N) is greater than or equal to a respective predetermined nominal expected black-to-white ratio for each segment (2) through segment (N). Process control proceeds from step (S230-16) to the process continue step (S230-30). This process continue step (S230-30) returns process control to step (S250).

Otherwise, process control proceeds from step (S230-16) to step (S230-26) when the processor (30) determines in step (S230-16) that the calculated black-to-white ratio for each segment (2) through segment (N) is less than a respective predetermined nominal expected black-to-white ratio for each segment (2) through segment (N). A predetermined minimum expected black-to-white ratio for segment (W) sets forth percentage amount of pixels within segment (W) having a foreground color to the total number of pixels within the bi-tonal image area (82). However, the predetermined minimum expected black-to-white ratio is initialized to a value that is less than the predetermined nominal expected black-to-white ratio. The predetermined minimum expected black-to-white ratio may be initialized within step (S30).

The processor (30) in step (S230-26) sets the forced-orientation-checked-flag to "TRUE" when the processor (30) determines in step (S230-16) that both the orientation-established-flag is set to "FALSE" and the calculated black-to-white ratio for each segment (2) through segment (N) is greater than or equal to a respective predetermined minimum expected black-to-white ratio for each segment (2) through segment (N). Moreover, the processor (30) in step (S230-26) sets the color-set-flag to a value of "TRUE" and assigns an instruction value (V4) as the instruction command when the processor (30) determines in step (S230-16) that the orientation-established-flag is not set to "FALSE" or that the calculated black-to-white ratio for each segment (2) through segment (N) is less than the respective predetermined minimum expected black-to-white ratio for each segment (2) through segment (N). Process control proceeds from step (S230-26) to the process continue step (S230-30). This process continue step (S230-30) returns process control to step (S250).

Figure 2E:
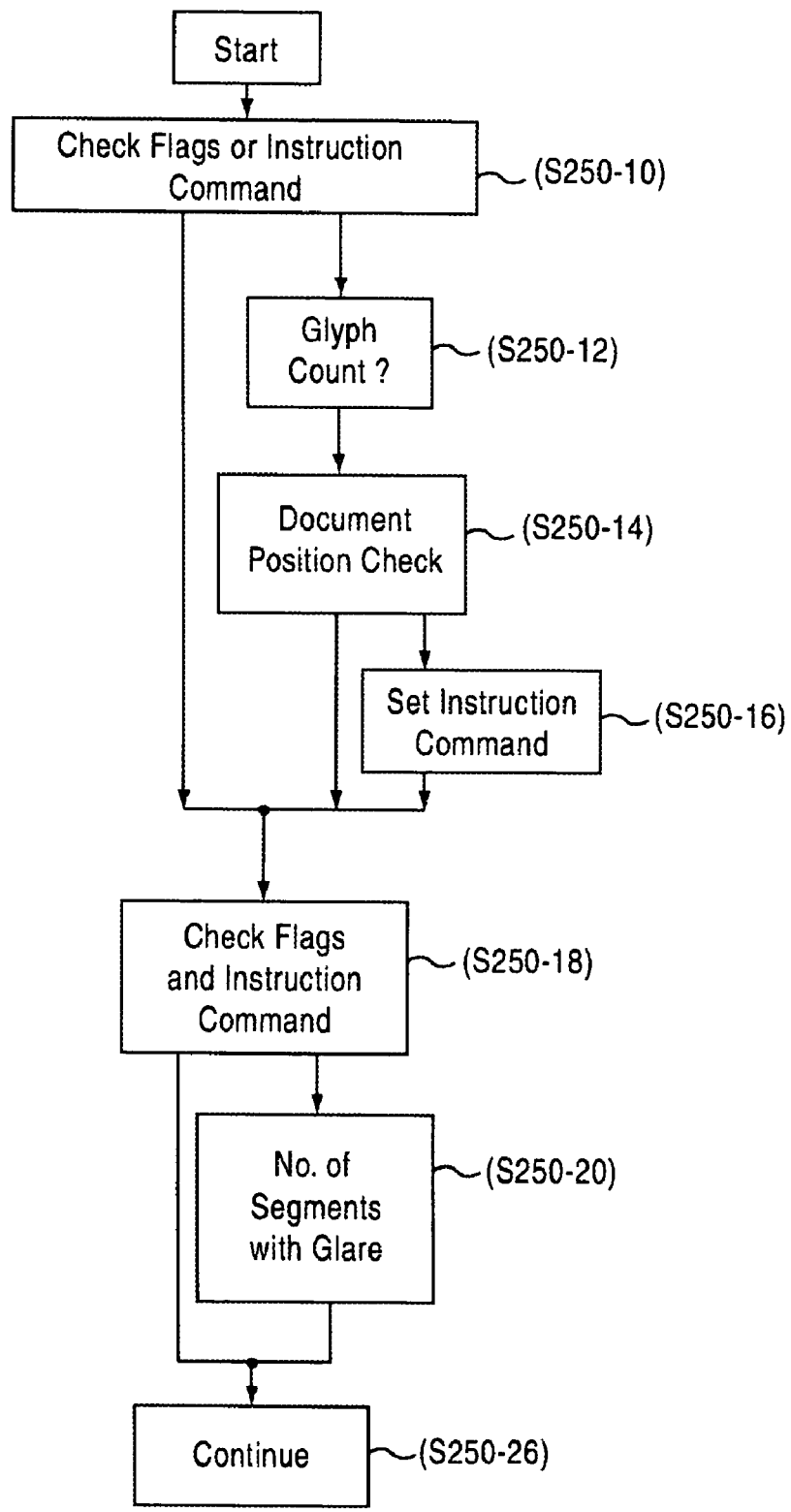
FIG. 2E is a composite flow diagram illustrating an evaluation of the previously performed tests.

Step (S250) provides an evaluation of the tests performed within step (S170), step (S190), step (S210), and step (S230). FIG. 2E is a composite flow diagram illustrating the process of step (S250). In step (S250-10), the processor (30) determines whether or not the color-set-flag is set to "FALSE" and the invalid-frame-status-flag is set to "TRUE". The processor (30) in step (S250-10) additionally determines whether or not the instruction command has been assigned an instruction value (V2).

Process control proceeds from step (S250-10) to the process continue step (S250-18) when the color-set-flag is not set to "FALSE", when the invalid-frame-status-flag is not set to "TRUE", or when the instruction command is other than an instruction value (V2). Otherwise, process control proceeds from step (S250-10) to step (S250-12) when the color-set-flag is set to "FALSE" and the invalid-frame-status-flag is set to "TRUE", or when the instruction command has been assigned an instruction value (V2).

Glyphs (85) are shown in FIG. 1B as glyph (85-1,1) through glyph (85-x,y). In step (S250-12), the processor (30) determines whether or not the number of glyphs within row (r) is within an acceptable tolerance. Specifically, the processor (30) determines whether or not the number of glyphs (85) present within row (r) is greater than the minimum permitted glyph count for row (r) but less than the maximum permitted glyph count for row (r). Process control proceeds from step (S250-12) to step (S250-18) when the processor (30) determines in step (S250-12) that the number of glyphs (85) present within row (r) is less than or equal to the minimum permitted glyph count for row (r). Process control also proceeds from step (S250-12) to the process continue step (S250-26) when the processor (30) determines in step (S250-12) that the number of glyphs (85) present within row (r) is greater than or equal to the maximum permitted glyph count for row (r). Otherwise, process control proceeds from step (S250-12) to step (S250-14) when the processor (30) determines in step (S250-12) that the number of glyphs (85) present within row (r) is greater than the minimum permitted glyph count for row (r) but less than the maximum permitted glyph count for row (r).

The processor (30) in step (S250-14) determines whether or not the document (80) is close to the lens (15). Process control proceeds from step (S250-12) to the process continue step (S250-26) when the processor (30) determines in step (S250-12) that document (80) is not close to the lens (15). Otherwise, process control proceeds from step (S250-12) to step (S250-16) when the processor (30) determines in step (S250-12) that document (80) is not close to the lens (15).

The processor (30) in step (S250-16) sets the color-set-flag to a value of "TRUE" and assigns an instruction value (V1) as the instruction command. Process control proceeds from step (S250-16) to a process continue in step (S250-18).

In step (S250-18), the processor (30) determines whether or not the invalid-frame-status-flag is set to "FALSE" or the instruction command has been assigned an instruction value (V2). The processor (30) in step (S250-18) additionally determines whether or not the forced-orientation-checked-flag to "FALSE". Process control proceeds from step (S250-18) to the process continue step (S250-26) when the invalid-frame-status-flag is set to "TRUE" and the instruction command is other than an instruction value (V2). Process control also proceeds from step (S250-18) to the process continue step (S250-26) when the processor (30) in step (S250-18) determines that the forced-orientation-checked-flag to "TRUE". This process continue step (S250-26) returns process control to step (S270).

Otherwise, process control proceeds from step (S250-18) to the process continue step (S250-20) when the processor (30) in step (S250-18) determines that the invalid-frame-status-flag is set to "FALSE". But when the processor (30) in step (S250-18) determines that the invalid-frame-status-flag is set to "TRUE", process control proceeds from step (S250-18) to the process continue step (S250-20) if the processor (30) in step (S250-18) determines that the instruction command has been assigned an instruction value (V2) and that the forced-orientation-checked-flag to "FALSE".

FIG. 4 shows a partitioning of the bi-tonal image area (82) into segment (1) through segment (N). The processor (30) in step (S250-20) counts the number of segments having a calculated black-to-white ratio that is less than a respective predetermined nominal expected black-to-white ratio. Also within step (S250-20), the processor (30) sets the color-set-flag to a value of "TRUE" and assigns an instruction value (V4) as the instruction command when the processor (30) determines that only one segment has a calculated black-to-white ratio that is less than a respective predetermined nominal expected black-to-white ratio. Process control then proceeds from step (S250-20) to the process continue step (S250-26). This process continue step (S250-26) returns process control to step (S270).

In step (S270), the processor (30) determines whether or not the scan actuator (70) is actuated. Process control then proceeds from step (S270) to step (S50) if the scan actuator (70) is actuated in step (S270). Otherwise, process control proceeds from step (S270) to step (S290). A light beam may be emitted from the aimer (12) when the aimer (12) is present and operational within the imagery apparatus (1), as described hereinabove. The light from the aimer (12) is extinguished during step (S290) if the aimer (12) has been illuminated during step (S30). Thereafter, process control proceeds from step (S290) to step (S330).

In step (S330), the processor (30) determines status of the invalid-frame-status-flag. Specifically, the processor (30) in step (S330) sets the color-set-flag to a value of "TRUE" and assigns an instruction value (V7) as the instruction command as the instruction command when the processor (30) determines in step (S330) that that the invalid-frame-status-flag is set to "FALSE". Thereafter, process control proceeds from step (S330) to step (S350). The imagery apparatus (1) indicates the capture of a valid frame in step (S350) when the processor (30) in step (S330) determines that the invalid-frame-status-flag is set to "FALSE". Thereafter, process control proceeds to step (390) and is terminated.

Otherwise, process control proceeds from step (S330) to step (S370) when the processor (30) determines in step (S330) that that the invalid-frame-status-flag is set to "TRUE". Within step (S370), the imagery apparatus (1) indicates the capture of an invalid frame when the processor (30) in step (S330) determines that the invalid-frame-status-flag is set to "TRUE". Thereafter, process control proceeds to step (390) and is terminated.

The description of the present invention should not be construed restrictively; advantages, features, and uses of the present invention will become still more apparent from the following description given with reference to the accompanying drawings. Further, it should be understood that all appropriate modifications made without departing from the gist of the present invention are covered by the scope of the present invention.

While various embodiments of the present invention are described, it should be understood that they have been presented by way of example only, and not as a limitation. Thus, the breadth and scope of the present invention should not be limited by any of the above-described exemplary embodiments, but should be defined only in accordance with the claims that may issue therefrom and their equivalents.

What is claimed is:

1. An apparatus for detecting and analyzing imagery, the apparatus comprising a processor which executes a set of routines, the routines comprising:
    an image data acquisition routine for acquiring image data, the image data comprising an image of a document the document being imaged being illuminated by a light external to the apparatus;
    an image data conversion routine for converting the acquired image data into a grayscale image frame;
    an adaptive thresholding routine for converting the grayscale image frame into a bi-tonal frame;
    an image selection routine for converting the grayscale image into a plurality of image segments; and,
    a glare testing routine for testing the black-to-white ratio of the bi-tonal frame.

2. The apparatus of claim 1, further comprising:
    a machine-readable zone routine for testing for the presence of a machine-readable zone within the bi-tonal frame.

3. The apparatus of claim 1, further comprising:
    a size identifier routine for determining the average height of glyphs within a machine-readable zone.

4. The apparatus of claim 1, further comprising:
    a position identifier routine for determining the area bordering a machine-readable zone, the machine-readable zone being disposed within the bi-tonal frame.

5. The apparatus of claim 1, wherein each pixel within the grayscale image frame is represented only by shades of gray.

6. The apparatus of claim 1, wherein each pixel within the bi-tonal frame is represented only by two tones of colors.

7. A method for detecting and analyzing imagery, comprising:
    acquiring image data from a document, the image data comprising an image of the document, the document being imaged being illuminated by a light external to an apparatus;
    converting the acquired image data into a grayscale image frame;
    converting the grayscale image frame into a bi-tonal frame using adaptive thresholding;
    converting the grayscale image into a plurality of image segments; and
    testing the black-to-white ratio of the bi-tonal frame to identify glare present within the bi-tonal frame
    the acquiring, converting, and testing steps being performed by a processor of an apparatus.

8. The method of claim 7, further comprising:
    of testing for the presence of a machine-readable zone within the bi-tonal frame.

9. The method of claim 7, further comprising:
    determining the average height of glyphs within a machine-readable zone.

10. The method of claim 8, further comprising:
    determining the area bordering a machine-readable zone, the machine-readable zone being disposed within the bi-tonal frame.

11. The method of claim 7, wherein each pixel within the grayscale image frame is represented only by shades of gray.

12. The method of claim 7, wherein each pixel within the bi-tonal frame is represented only by two tones of colors.

13. A computer readable storage medium having stored thereon, storage medium for storing, in a computer-readable format, routines comprising:
- an image data acquisition routine adapted to acquire image data from a document;
- an image data conversion routine adapted to convert the acquired image data into a grayscale image frame; and
- an adaptive thresholding routine adapted to convert the grayscale image frame into a bi-tonal frame,
- an image segmenting routine to convert the grayscale image into a plurality of image segments; and,
- a glare routine adapted to test the black-to-white ratio of the bi-tonal frame.

14. The computer readable storage medium of claim 13, further comprising:
- a machine-readable zone routine adapted to test for the presence of a machine-readable zone within the bi-tonal frame.

15. The computer readable storage medium of claim 13, further comprising:
- a size routine adapted to determine the average height of glyphs within a machine-readable zone.

16. The computer readable medium of claim 13, further comprising:
- a position routine adapted to determine the area bordering a machine-readable zone, the machine-readable zone being disposed within the bi-tonal frame.

17. The computer readable medium of claim 13, wherein each pixel within the grayscale image frame is represented only by shades of gray.

18. The computer readable medium of claim 13, wherein each pixel within the bi-tonal frame is represented only by two tones of colors.

19. The apparatus of claim 1 wherein the apparatus comprises a handheld, portable computing device.

20. The method of claim 7, the computing device comprising a handheld, portable computing device.

21. The computer readable storage medium of claim 13, the document being imaged being illuminated by a light external to the apparatus.

\* \* \* \* \*